United States Patent [19]

Hendreich et al.

[11] Patent Number: 5,578,653
[45] Date of Patent: Nov. 26, 1996

[54] PREPARATION OF CELLULAR POLYURETHANES

[75] Inventors: Regina Hendreich, Frauendorf; Peter Falke, Schwarzheide; Dieter Tintelnot, Diepholz; Marion Wenzel, Ludwigshafen, all of Germany

[73] Assignee: BASF Schwarzheide, Germany

[21] Appl. No.: 542,249

[22] Filed: Oct. 12, 1995

[30] Foreign Application Priority Data

Nov. 10, 1994 [DE] Germany ............... 44 40 212.0

[51] Int. Cl.$^6$ ................................................ C08G 18/00
[52] U.S. Cl. ............................. 521/114; 521/131
[58] Field of Search ................................. 521/114, 131

[56] References Cited

U.S. PATENT DOCUMENTS

| | | |
|---|---|---|
| 3,267,050 | 8/1966 | Kuryla et al. |
| 3,304,273 | 2/1967 | Stamberger et al. |
| 3,383,351 | 5/1968 | Stamberger et al. |
| 3,523,093 | 8/1970 | Stamberger et al. |
| 3,824,199 | 8/1974 | Nadeau et al. |
| 4,304,708 | 12/1981 | Marx et al. |
| 4,374,209 | 2/1983 | Rowlands et al. |
| 5,075,346 | 12/1991 | Sonnenberg et al. |
| 5,189,074 | 2/1993 | Moore et al. |
| 5,210,103 | 5/1993 | Valoppi et al. |
| 5,283,003 | 2/1994 | Chen et al. |

FOREIGN PATENT DOCUMENTS

| | | |
|---|---|---|
| 2544560 | 4/1977 | Germany. |
| 3231497 | 3/1984 | Germany. |
| 3607447 | 9/1987 | Germany. |
| 4210404 | 10/1992 | Germany. |
| 60-133034 | 7/1985 | Japan. |
| 969965 | 9/1964 | United Kingdom. |
| 987618 | 3/1965 | United Kingdom. |
| 1033912 | 6/1966 | United Kingdom. |
| 1040452 | 8/1966 | United Kingdom. |
| 1209243 | 10/1970 | United Kingdom. |
| 1321679 | 6/1973 | United Kingdom. |

OTHER PUBLICATIONS

Teda and Toyocat News, Jun. 1994, vol. 1.

*Primary Examiner*—Morton Foelak
*Attorney, Agent, or Firm*—Mary E. Golota

[57] ABSTRACT

A process for the production of cellular polyurethanes by reacting
a) at least one organic and/or modified organic polyisocyanate,
b) at least one relatively high-molecular-weight compound containing at least two reactive hydrogen atoms, if desired
c) low-molecular-weight chain extenders and/or crosslinking agents,
in the presence of
d) blowing agents,
e) catalysts, and, if desired,
f) auxiliaries and/or additives,
wherein the blowing agent d) is at least one acetal.

16 Claims, No Drawings

PREPARATION OF CELLULAR POLYURETHANES

The present invention relates to a process for the preparation of cellular polyurethanes, in particular polyurethane moldings having a compacted peripheral zone and a cellular core, known as structural foams.

Polyurethane structural foams have been known for some time and have a variety of applications, for example as shoe soles or as safety parts in motor vehicles.

They are usually prepared by reacting organic polyisocyanates and/or modified organic polyisocyanates with relatively highly functional compounds containing at least two reactive hydrogen atoms, for example polyoxyalkylene-polyamines and/or preferably organic polyhydroxyl compounds, in particular polyetherols having molecular weights of, for example from 300 to 10,000, and, if desired, chain extenders and/or crosslinking agents having molecular weights of up to about 400 in the presence of catalysts, blowing agents, auxiliaries and/or additives. Their preparation has been described in a number of documents. A review of the production of polyurethane structural foams (moldings having a compacted peripheral zone and a cellular core) is given, for example, in Kunststoff-Handbuch, Volume VII, Polyurethane, 1st Edition 1966, edited by Dr. R. Vieweg and Dr. A. Höchtlen and 2nd Edition, 1983, edited by Dr. G. Oertel (Carl Hanser Verlag, Munich), and in Integralschaumstoffe by Dr. H. Piechota and Dr. H. Röhr, Carl-Hanser-Verlag, Munich, Vienna, 1975. These processes are also described in DE-A-16 94 138 (GB 1,209,243), DE-C-1 955 891 (GB 1,321,679) and DE-B-1 769 886 (U.S. Pat. No. 3,824,199).

The blowing agents usually used in the past were chlorofluorocarbons. However, since these compounds degrade the ozone layer, they can no longer be used as blowing agents for polyurethane foams. Various alternatives have been proposed. For example, DE-A-42 10 404 describes the use of partially halogenated hydrocarbons, known as HCFCs or HFCs, as blowing agents for polyurethane foams. Although these compounds are less harmful to the ozone layer than chlorofluorocarbons, they are still ecologically unacceptable and must be replaced.

U.S. Pat. No. 5,210,103 proposes the use of volatile silicones and water as blowing agent for polyurethane structural foams. DE-A-25 44 560 describes a blowing agent mixture for polyurethane structural foams which contains HCFCs, acetone and diethyl ether.

U.S. Pat. No. 5,283,003 describes a blowing agent combination for polyurethane foams which comprises methylene chloride, methyl formate and pentane.

U.S. Pat. Nos. 5,189,074 and 5,075,346 describe the use of tert-butyl methyl ether as blowing agent for polyurethane foams, it also being possible for the ether to be introduced into the reaction mixture via a polymer.

TEDA and TOYOCAT NEWS, June 1994, Vol. 1, describes the use of 1,3-dioxolane as blowing agent for rigid polyurethane foams.

However, all these have disadvantages. Thus, blowing agents which work with elimination of carbon dioxide frequently result in low quality of the peripheral zone, and undesired pore formation occurs. Flammable blowing agents, in particular pentane, require complex safety precautions during foam production.

It is an object of the present invention to find a blowing agent for polyurethane structural foams which does not damage the environment, is easy to handle without particular safety precautions and gives polyurethane structural foams having good quality, in particular having a uniform surface.

We have found that, surprisingly, this object is achieved by using acetals as blowing agents for polyurethane structural foams.

Accordingly, the present invention provides a process for the preparation of cellular polyurethanes by reacting
a) at least one organic and/or modified organic polyisocyanate,
b) at least one relatively high-molecular-weight compound containing at least two reactive hydrogen atoms, if desired
c) low-molecular-weight chain extenders and/or crosslinking agents,
in the presence of
d) blowing agents,
e) catalysts, and, if desired,
f) auxiliaries and/or additives,
wherein the blowing agent d) is at least one acetal.

Particular advantages are achieved by the novel use of acetals as blowing agents in the production of polyurethane structural foams, ie. polyurethane foams having a compacted peripheral zone and a cellular core.

Accordingly, the present invention provides in particular a process for the production of polyurethane structural foams by reacting
a) organic and/or modified organic polyisocyanates with
b) at least one relatively high-molecular-weight compound containing at least two reactive hydrogen atoms and, if desired,
c) low-molecular-weight chain extenders and/or crosslinking agents,
in the presence of
d) blowing agents,
e) catalysts, and, if desired,
f) conventional auxiliaries and/or additives,
in a closed mold with compaction, wherein the blowing agents (d) are acetals, if desired in combination with other blowing agents. The acetals employed have a boiling point in the range from 40° to 140° C., preferably from 40° to 120° C., in particular from 40° to 90° C.

A particularly suitable blowing agent for the novel process is methylal, but other preferred representatives are dimethoxyethane, diethoxymethane, diethoxyethane, 1,3-dioxolane and 2-methyl-1,3-dioxolane. The acetals can be employed alone, in mixtures with one another or together with conventional blowing agents.

The acetals are used, in particular, in an amount of from 0.1 to 20% by weight, based on the weight of components a) to f). For polyurethane structural foams, the acetals are preferably employed in an amount of from 0.2 to 8% by weight. It is possible to use the acetals alone, in mixtures with one another or in mixtures with other blowing agents which are conventional in polyurethane chemistry.

For example, the acetals can be used together with water, aliphatic and/or cycloaliphatic hydrocarbons or partially halogenated hydrocarbons as blowing agents.

Preference is given to mixtures of from 0.1 to 20% by weight of at least one acetal and from 0.1 to 5% by weight of water, to mixtures of from 0.1 to 20% by weight of at least one acetal and from 0.1 to 15% by weight of at least one aliphatic and/or cycloaliphatic hydrocarbon, and to mixtures of from 0.1 to 20% by weight of at least one acetal and from 0.1 to 15% by weight of at least one partially halogenated hydrocarbon. The % by weight data in each case again refer to the total weight of components a) to
f). If water is used as co-blowing agent, the water usually present in the polyols must be taken into account.

For specific areas of application, for example for flexible, low-density polyurethane foams, larger amounts of blowing agent can also be employed.

The blowing agent or blowing agent mixture is usually added to the polyol component, but it can also be added to the isocyanate component for certain applications.

The following details apply to the starting components used for the novel process:

a) Suitable organic polyisocyanates are the aliphatic, cycloaliphatic, araliphatic and preferably aromatic polyisocyanates known per se.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (IPDI), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, eg. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,2'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, ie. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing 33.6 to 15% by weight, preferably from 31 to 21% by weight, of NCO, based on the total weight, for example 4,4'-diphenylmethane diisocyanate, 4,4'- and 2,4'-diphenylmethane diisocyanate mixtures or crude MDI or 2,4- and/or 2,6-tolylene diisocyanate, in each case modified by means of low-molecular-weight diols, triols, dialkylene glycols, trialkylene glycols or polyoxyalkylene glycols having molecular weights of up to 6000, in particular up to 1500, specific examples of di- and polyoxyalkylene glycols, which can be employed individually or as mixtures, being diethylene, dipropylene, polyoxyethylene, polyoxypropylene and polyoxypropylene-polyoxyethylene glycols, -triols and/or -tetrols. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably 31 to 21% by weight, of NCO, based on the total weight, eg. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, eg. 2,4'- or 4,4'-diphenylmethane diisocyanate, crude MDI or 2,4- and/or 2,6-tolylene diisocyanate.

Organic polyisocyanates which have proven particularly successful and are therefore preferred for use in the production of cellular elastomers are: NCO-containing prepolymers having an NCO content of from 25 to 9% by weight, in particular based on polyether- or polyester-polyols and one or more diphenylmethane diisocyanate isomers, advantageously 4,4'-diphenylmethane diisocyanate and/or modified, urethane groups-containing organic polyisocyanates having an NCO content of from 33.6 to 15% by weight, in particular based on 4,4'-diphenylmethane diisocyanate or diphenylmethane diisocyanate isomer mixtures: those which are preferred for the production of flexible polyurethane foams are mixtures of 2,4- and 2,6-tolylene diisocyanates, mixtures of tolylene diisocyanates and polyphenyl-polymethylene polyisocyanate or in particular mixtures of the abovementioned prepolymers based on diphenylmethane diisocyanate isomers and crude MDI (polyphenyl-polymethylene polyisocyanate) having a diphenylmethane diisocyanate isomer content of from 30 to 80% by weight. The relatively high-molecular-weight compounds containing at least two reactive hydrogen atoms are expediently those having a functionality of from 2 to 8, preferably from 2 to 4, and a molecular weight of from 300 to 10,000, preferably from 1000 to 6000. Success has been achieved using, for example, polyetherpolyamines and/or preferably polyols selected from the group comprising the polyether-polyols, polyesterpolyols, polythioether-polyols, polyesteramides, hydroxyl-containing polyacetals and hydroxyl-containing aliphatic polycarbonates or mixtures of at least two of said polyols. Preference is given to polyester-polyols and/or polyetherpolyols. The hydroxyl number of the polyhydroxyl compounds is generally from 20 to 120, preferably from 27 to 60.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic acid esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol and 1,6-hexanediol. Furthermore, polyester-polyols made from lactones, eg. ε-caprolactone or hydroxycarboxylic acids, e.g. ω-hydroxycaproic acid, may also be employed.

The polyester-polyols may be prepared by polycondensing the organic, eg. aromatic and preferably aliphatic polycarboxylic acids and/or derivatives thereof and polyhydric alcohols without using a catalyst or preferably in the presence of an esterification catalyst, expediently in an inert gas atmosphere, eg. nitrogen, carbon monoxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, eg. benzene, toluene, xylene or chlorobenzene, for removal of the water of condensation by azeotropic distillation. The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 480 to 3000, preferably from 1000 to 3000.

However, the polyols used are in particular polyether-polyols prepared by conventional processes, for example by anionic polymerization using alkali metal hydroxides such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably 2 to 4, reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety. Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane.

Other suitable initiator molecules are alkanolamines, eg. ethanolamine, N-methyl- and N-ethylethanolamine, dialkanolamines, eg. diethanolamine, N-methyl- and N-ethyldiethanolamine, and trialkanolamines, eg. triethanolamine, and ammonia. Preference is given to polyhydric alcohols, in particular dihydric and/or trihydric alcohols, such as ethanediol, 1,2- and 2,3-propanediol, diethylene glycol, dipropylene glycol, 1,4-butanediol, 1,6-hexanediol, glycerol, trimethylolpropane and pentaerythritol.

The polyether-polyols, preferably polyoxypropylene- and polyoxypropylene-polyoxyethylene-polyols, advantageously have a functionality of from 2 to 4 and molecular weights of from 300 to 10,000, preferably from 1000 to 6000, in particular from 1500 to 5000, and suitable polyoxytetramethylene glycols have a molecular weight of up to approximately 3500.

Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 9,876,618), and polyetherpolyol dispersions which contain, as the disperse phase, usually in an amount of from 1 to 50% by weight, preferably from 2 to 25% by weight, for example polyureas, polyhydrazides, polyurethanes containing tertiary amino groups in bound form, and/or melamine and described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. Furthermore, they may be mixed with the graft polyether-polyols or polyester-polyols and the hydroxyl-containing polyesteramides, polyacetals, polycarbonates and/or polyetherpolyamines.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared by reacting diols, such as 1,3-propanediol, 1,4-butanediol and/or 1,6-hexanediol, diethylene glycol, triethylene glycol or tetraethylene glycol, with diaryl carbonates, eg. diphenyl carbonate, or phosgene.

The polyester-amides include, for example, the predominantly linear condensates obtained from polybasic, saturated and/or unsaturated carboxylic acids or anhydrides thereof and polyhydric, saturated and/or unsaturated antino alcohols, or mixtures of polyhydric alcohols and amino alcohols and/or polyamines.

Suitable polyether-polyamines can be prepared by known methods from the abovementioned polyether-polyols. Mention may be made by way of example of the cyanoalkylation of polyoxyalkylene-polyols followed by hydrogenation of the resultant nitrile (U.S. Pat. No. 3,267,050), or the partial or full amination of polyoxyalkylene-polyols using amines or ammonia in the presence of hydrogen and catalysts (DE 12 15 373).

c) The moldings having a compacted peripheral zone and a cellular core can be produced with or without the use of chain extenders and/or crosslinking agents. However, it may prove advantageous, in order to modify the mechanical properties, for example the hardness, to add chain extenders, crosslinking agents or, if desired, mixtures thereof. Examples of chain extenders and/or crosslinking agents are diols and/or triols having a molecular weight of less than 400, preferably from 60 to 300. Examples are aliphatic, cycloaliphatic and/or araliphatic diols having from 2 to 14 carbon atoms, preferably from 4 to 10 carbon atoms, eg. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,5-trihydroxycyclohexane, glycerol and trimethylolpropane, and low-molecular-weight hydroxyl-containing polyalkylene oxides, based on ethylene oxide and/or 1,2-propylene oxide, and the abovementioned diols and/or triols as initiator molecules.

For the production of cellular elastomer moldings and structural foams, secondary aromatic diamines, primary aromatic diamines, 3,3'-di- and/or 3,3',5,5'-tetraalkyl-substituted diaminodiphenylmethanes can be used as chain extenders or crosslinking agents in addition to the abovementioned diols and/or triols or mixed therewith.

Examples which may be mentioned of secondary aromatic diamines are N,N'-dialkyl-substituted aromatic diamines, which are unsubstituted or substituted on the aromatic ring by alkyl groups, having 1 to 20, preferably 1 to 4, carbon atoms in the N-alkyl radical, eg. N,N'-di-sec-pentyl-, N,N'-di-sechexyl-, N,N'-di-sec-decyl- and N,N'-dicyclohexyl-p- and -m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

d) The blowing agents (d) used according to the invention are, as described above, acetals, which can be employed individually, in mixtures with one another or in mixtures with other co-blowing agents.

e) The catalysts used to produce the moldings having a compacted peripheral zone and a cellular core are, in particular, compounds which greatly accelerate the reaction of the reactive hydrogen atoms, in particular hydroxyl-containing compounds of component (b) and, if used, (c) with the organic, modified or unmodified polyisocyanates (a). Suitable compounds are organometallic compounds, preferably organotin compounds, such as tin(II) salts of organic carboxylic acids, eg. tin(II) acetate, tin(II) octanoate, tin(II) ethylhexanoate and tin(II) laurate, and dialkyltin(IV) salts of organic carboxylic acids, eg. dibutyltin diacetate, dibutyltin dilaurate, dibutyltin maleate and dioctyltin diacetate. The organometallic compounds can be employed alone or preferably in combination with highly basic amines. Examples which may be mentioned are amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N'N'-tetramethylbutanediamine, N,N,N',N'-tetramethyl-1,6-hexanediamine, pentamethyldiethylenetriamine, tetramethyldiaminoethyl ether, bis-(dimethylaminopropyl)urea, dimethylpiperazine, 1,2-dimethylimidazole, 1-aza-bicyclo-[3.3.0]octane, and, preferably, 1,4-diazabicyclo[2.2.2]octane and alkanolamine compounds such as triethanolamine, triisopropanolamine, N-methyl- and N-ethyldiethanolamine and dimethylethanolamine.

Other suitable catalysts are: tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxide, such as sodium hydroxide, and alkali metal alkoxides, such as sodium methoxide and potassium isopropoxide, and alkali metal salts of long-chain fatty acids having 10 to 20 carbon atoms and, if desired, pendant OH groups. From 0,001 to 5% by weight, in particular from 0.05 to 2% by weight, of catalyst or catalyst combination, based on the weight of formative component (b), are preferably used.

f) Auxiliaries and/or additives (f) can also be incorporated into the reaction mixture for the production of the moldings having a compacted peripheral zone and a cellular core. Examples which may be mentioned are surfactants, foam stabilizers, cell regulators, fillers, dyes, pigments, flameproofing agents, hydrolysis-protection agents and fungistatic and bacteriostatic substances. Examples of suitable surfactants are compounds which serve to support homogenization of the starting materials and may also be suitable for regulating the cell structure of the plastics. Specific examples are emulsifiers, such as the sodium salts of castor oil sulfates, or of fatty acids and salts of fatty acids with amines, for example diethylamine oleate, diethanolamine stearate and diethanolamine ricinoleate, salts of sulfonic acids, eg. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore the abovementioned oligomeric acrylates containing polyoxyalkylene and fluoroalkane radicals as side groups. The surfactants are usually used in amounts of from 0.01 to 5 parts by weight, based on 100 parts by weight of components (b) to (f).

Examples which may be mentioned of suitable blowing agents are: products of the reaction of fatty acid esters with polyisocyanates, salts of amino-containing polysiloxanes and fatty acids, salts of saturated or unsaturated (cyclo)aliphatic carboxylic acids having at least 8 carbon atoms and tertiary amines, and, in particular, internal release agents, for example carboxylates and/or carboxamides, prepared by esterification or amination of a mixture of montanic acid and at least difunctional alkanolamines, polyols and/or polyamines having a molecular weight of from 60 to 400 (EP-A-153 639) or mixtures of organic amines, metal salts of stearic acid and organic mono- and/or dicarboxylic acids or anhydrides thereof (DE-A-36 07 447).

For the purposes of the present invention, fillers, in particular reinforcing fillers, are conventional organic and inorganic fillers, reinforcing agents, weighting agents, agents for improving the abrasion behavior of paints, coating compositions etc known per se. Specific examples are inorganic fillers, such as silicate minerals, for example phyllosilicates, such as antigorite, serpentine, hornblends, amphiboles, chrysotile, talc; metal oxides, such as kaolin, aluminum oxides, titanium oxides and iron oxides, metal salts, such as chalk, barytes and inorganic pigments, such as cadmium sulfide, zinc sulfide and glass, inter alia. Preference is given to kaolin (china clay), aluminum silicate and co-precipitates of barium sulfate and aluminum silicate, and natural and synthetic fibrous minerals, such as wollastonite, metal fibers and in particular glass fibers of various lengths, which may have been sized. Examples of suitable organic fillers are: charcoal, melamine, collophony, cyclopentadienyl resins and graft polymers, and cellulose fibers, polyamide fibers, polyacrylonitrile fibers, polyurethane fibers and polyester fibers based on aromatic and/or aliphatic dicarboxylic acid esters, and in particular carbon fibers. The inorganic and organic fillers may be used individually or as mixtures and are advantageously introduced into the reaction mixture in amounts of from 0.5 to 50% by weight, preferably from 1 to 40% by weight, based on the weight of components (b–f).

Examples of suitable flameproofing agents are tricresyl phosphate, tris(2-chloroethyl) phosphate, tris(2-chloropropyl) phosphate, tetrakis(2-chloroethyl)ethylene diphosphate, dimethyl methanephosphonate, diethyl diethanolaminomethyl phosphonate and commercially available halogen-containing flameproofing polyols.

In addition to the abovementioned halogen-substituted phosphates, it is also possible to use inorganic or organic flameproofing agents, such as red phosphorus, aluminum oxide hydrate, antimony trioxide, arsenic oxide, ammonium polyphosphate and calcium sulfate, expandable graphite or cyanuric acid derivatives, eg. melamine, or mixtures of two or more flameproofing agents, eg. ammonium polyphosphate and melamine, and also, if desired, corn starch or ammonium polyphosphates, melamine and expandable graphite and/or, if desired, aromatic polyesters, in order to flameproof the polyisocyanate polyaddition products. In general, it has proven expedient to use from 5 to 50 parts by weight, preferably from 5 to 25 parts by weight, of said flameproofing agents per 100 parts by weight of formative components (b–f).

Further details on the other conventional assistants and additives mentioned above can be obtained from the specialist literature, for example from the monograph by J. H. Saunders and K. C. Frisch in High Polymers, Volume XVI, Polyurethanes, Parts 1 and 2, Interscience Publishers 1962 and 1964 respectively, or Kunststoff-Handbuch, Polyurethane, Volume VII, Carl-Hanser-Verlag, Munich, Vienna, 1st and 2nd Editions, 1966 and 1983. To produce the moldings having a compacted peripheral zone and a cellular core, the organic polyisocyanates (a), the relatively high-molecular-weight compounds (b) containing at least two reactive hydrogen atoms and, if used, chain extenders and/or crosslinking agents (c) are reacted in such amounts that the equivalence ratio between the NCO groups of the polyisocyanates (a) and the total number of reactive hydrogen atoms in components (b) and, if used, (c) and, if water is used as blowing agent, also in the water is from 0.85 to 1.25:1, preferably from 0.95 to 1.15:1, in particular from 1 to 1.05:1. If the polyurethane structural foams contain at least some bonded isocyanurate groups, a ratio between the number of NCO groups in the polyisocyanates (a) and the total number of reactive hydrogen atoms in components (b) and, if used, (c) of from 1.5 to 20:1, preferably from 1.5 to 8:1 is used.

The moldings having a compacted peripheral zone and a cellular core are advantageously produced by the one-shot process, for example using the high-pressure method or the low-pressure method in a closed mold, for example a metallic mold. These procedures are described, for example, by Piechota and Röhr in Integralschaumstoffe, Carl-Hanser-Verlag, Munich, Vienna, 1975.

It has proven particularly advantageous to use the two-component method and to combine components (b), (d), (e) and, if used, (c) and (f) in component (A) and to use the organic polyisocyanates, the modified polyisocyanates (a) or the mixture of said polyisocyanates and, if desired, the blowing agent (d) as component (B).

The starting components are mixed at from 15° to 90° C., preferably at from 20° to 60° C., in particular at from 20° to 45° C., and introduced into the open or closed mold at atmospheric pressure or superatmospheric pressure. The mold temperature is expediently from 20° to 110° C., preferably from 30° to 60° C., in particular from 45° to 55° C.

Moldings having a compacted peripheral zone and a cellular core produced by the novel process have a density of from 0.2 to 1.0 g/cm$^3$, preferably from 0.3 to 0.7 g/cm$^3$, in particular from 0.3 to 0.55 g/cm$^3$.

The polyurethane moldings produced by the novel process are distinguished over those of the prior art, in particular water-blown ones, by a significantly better, flaw-free and smooth surface. There is significant formation of the cellular core and the compacted peripheral zone. The acetals used according to the invention as blowing agents are readily compatible with the other constituents of the polyol component, so that no inhomogeneities or separations occur. Their use requires no particular safety precautions.

The novel process can be used both for flexible structural foams, as used, for example, as shoe soles and safety parts in automobiles, and for rigid structural foams, known as thermosetting foams.

The invention is described in greater detail, with reference to the examples below.

EXAMPLE 1 (comparison)

100 parts by weight of polyol component comprising 67.40 parts by weight of a trifunctional polyether alcohol having a hydroxyl number of 35 mg of KOH/g (Lupranol® 2045 from BASF AG), 11.65 parts by weight of a difunctional polyether alcohol having a hydroxyl number of 29 mg of KOH/g (Lupranol® 2043 from BASF AG) 13.00 parts by weight of a polymeric polyether alcohol having a hydroxyl number of 24 mg of KOH/g (Pluracol® 973 from BASF AG), 6.0 parts by weight of ethylene glycol, 1.1 parts by weight of an amine catalyst (Lupragen® N 201 from BASF AG) and 0.85 part by weight of water, were introduced into a sealable mold together with 56.4 parts by weight of a prepolymer based on diphenylmethane diisocyanate, carbodiimide-modified diphenylmethane diisocyanate and polyphenyl-polymethylene polyisocyanates having an NCO content of 26.3% by weight, and the components were reacted to give a polyurethane structural foam.

EXAMPLE 2

100 parts by weight of a polyol component comprising 66.40 parts by weight of Lupranol® 2045, 11.00 parts by weight of Lupranol® 2043, 13.00 parts by weight of Pluracol® 973, 6.00 parts by weight of ethylene glycol, 1.1 parts by weight of Lupragen® N 201, 0.60 part by weight of water and 1.9 parts by weight of methylal were reacted with 52.0 parts by weight of the prepolymer from Example 1 as described in Example 1.

EXAMPLE 3

100 parts by weight of a polyol component comprising 63.40 parts by weight of Lupranol® 2045, 11.20 parts by weight of Lupranol® 2043, 13.00 parts by weight of Pluracol® 973, 6.00 parts by weight of ethylene glycol, 1.1 parts by weight of Lupragen® N 201, 0.40 part by weight of water and 4.9 parts by weight of methylal were reacted with 48.0 parts by weight of the prepolymer from Example 1 as described in Example 1.

EXAMPLE 4

100 parts by weight of a polyol component comprising 66.40 parts by weight of Lupranol® 2045, 11.00 parts by weight of Lupranol® 2043, 13.00 parts by weight of Pluracol® 973, 6.00 parts by weight of ethylene glycol, 1.1 parts by weight of Lupragen® N 201, 0.60 part by weight of water, 1.60 parts by weight of methylal and 0.30 part by weight of 1,3-dioxolane were reacted with 51.8 parts by weight of the prepolymer from Example 1 as described in Example 1.

EXAMPLE 5

100 parts by weight of a polyol component comprising 65.9 parts by weight of Lupranol® 2045, 11.00 parts by weight of Lupranol® 2043, 13.00 parts by weight of Pluracol® 973, 6.00 parts by weight of ethylene glycol, 1.1 parts by weight of Lupragen® N 201, 0.60 part by weight of water, 1.60 parts by weight of methylal, 0.50 part by weight of 1,3-dioxolane and 0.3 part by weight of dimethylacetal were reacted with 51.8 parts by weight of the prepolymer from Example 1 as described in Example 1.

EXAMPLE 6 (comparison)

100 parts by weight of a polyol component comprising 65.9 parts by weight of Lupranol® 2043, 16.3 parts by weight of a trifunctional polyether alcohol having a hydroxyl number of 27 mg of KOH/g (Lupranol® 2042 from BASF AG), 3.1 parts by weight of Lupranol® 2045, 10.7 parts by weight of 1,4-butanediol, 2.0 parts by weight of ethylene glycol, 1.1 parts by weight of Lupragen® N201 and 0.9 part by weight of water were reacted with 75.3 parts by weight of the prepolymer from Example 1 as described in Example 1.

EXAMPLE 7

100 parts by weight of a polyol component comprising 65.9 parts by weight of Lupranol® 2043, 15 parts by weight of Lupranol® 2042, 3.1 parts by weight of Lupranol® 2045, 10.7 parts by weight of 1,4-butanediol, 2.0 parts by weight of ethylene glycol, 1.1 parts by weight of Lupragen® N201, 0.6 part by weight of water and 1.6 parts by weight of methylal were reacted with 69.7 parts by weight of the prepolymer from Example 1 as described in Example 1.

The Shore hardness of the moldings was measured in accordance with DIN 53 505, the density of the molding as a whole, of the core zone and of the peripheral zone was measured in accordance with DIN (53420) and the proportion of closed cells in the peripheral zone was determined by microscopic analysis. The results are shown in the table.

TABLE

| Ex. | Shore hardness | Density core zone [kg/m$^3$] | Density peripheral zone [kg/m$^3$] | Surface |
|---|---|---|---|---|
| 1 | A 78 | 400 | 750 | irregular, holes |
| 2 | A 78 | 410 | 960 | smooth, closed |
| 3 | A 77 | 390 | 920 | smooth, closed |
| 4 | A 79 | 385 | 930 | smooth, closed |
| 5 | A 78 | 405 | 900 | smooth, closed |
| 6 | A 50 | 455 | 780 | irregular, holes |
| 7 | A 53 | 463 | 920 | smooth, closed |

We claim:

1. A process for the preparation of cellular polyurethanes by reacting
   a) at least one organic and/or modified organic polyisocyanate,
   b) at least one relatively high-molecular-weight compound containing at least two reactive hydrogen atoms, optionally
   c) low-molecular-weight chain extenders and/or crosslinking agents,
   in the presence of
   d) blowing agents,
   e) catalysts, and, if desired,
   f) auxiliaries and/or additives,
   wherein the blowing agent d) is at least one acetal.

2. A process for the preparation of polyurethane moldings having a compacted peripheral zone and a cellular core by reacting
   a) at least one organic and/or modified organic polyisocyanate,
   b) at least one relatively high-molecular-weight compound containing at least two reactive hydrogen atoms, optionally
   c) low-molecular-weight chain extenders and/or crosslinking agents,
   in the presence of
   d) blowing agents,
   e) catalysts, and, if desired,
   f) auxiliaries and/or additives,
   wherein the blowing agent d) is at least one acetal.

3. A process as claimed in claim 1 or 2, wherein the acetals are employed in an amount of from 0.1 to 20% by weight, based on the weight of components a) to f).

4. A process as claimed in claim 1 or 2, wherein the acetals are employed in an amount of from 0.2 to 8% by weight, based on the weight of components a) to f).

5. A process claimed in claim 1 or 2, wherein the acetals have a boiling point of from 40° to 140° C.

6. A process as claimed in claim 1 or 2, wherein the acetals have a boiling point of from 40° to 120° C.

7. A process as claimed in claim 1 or 2, wherein the acetals have a boiling point of from 40° to 90° C.

8. A process as claimed in claim 1 or 2, wherein the acetals are selected from the group consisting of methylal, diethoxyethane, diethoxymethane, dimethoxyethane, 1,3-dioxolane and 2-methyl-1,3-dioxolane.

9. A process as claimed in claim 1 or 2, wherein the acetal employed is methylal.

10. A process as claimed in claim 1 or 2, wherein the blowing agent employed is a mixture of at least one acetal and conventional co-blowing agents.

11. A process as claimed in claim 1 or 2, wherein the blowing agent employed is a mixture of at least one acetal and water.

12. A process as claimed in claim 11, wherein the blowing agent employed is a mixture of from 0.05 to 20% by weight of at least one acetal and from 0.1 to 5% by weight of water.

13. A process as claimed in claim 1 or 2, wherein the blowing agent employed is a mixture of least one acetal and at least one aliphatic and/or cycloaliphatic hydrocarbon.

14. A process as claimed in claim 13, wherein the blowing agent employed is a mixture of from 0.1 to 20% by weight of at least one acetal and from 0.1 to 15% by weight of at least one aliphatic and/or cycloaliphatic hydrocarbon.

15. A process as claimed in claim 1 or 2, wherein the blowing agent employed is a mixture of at least one acetal and at least one partially halogenated hydrocarbon.

16. A process as claimed in claim 15, wherein the blowing agent employed is a mixture of from 0.1 to 20% by weight of at least one acetal and from 0.1 to 15% by weight of at least one partially halogenated hydrocarbon.

* * * * *